UNITED STATES PATENT OFFICE.

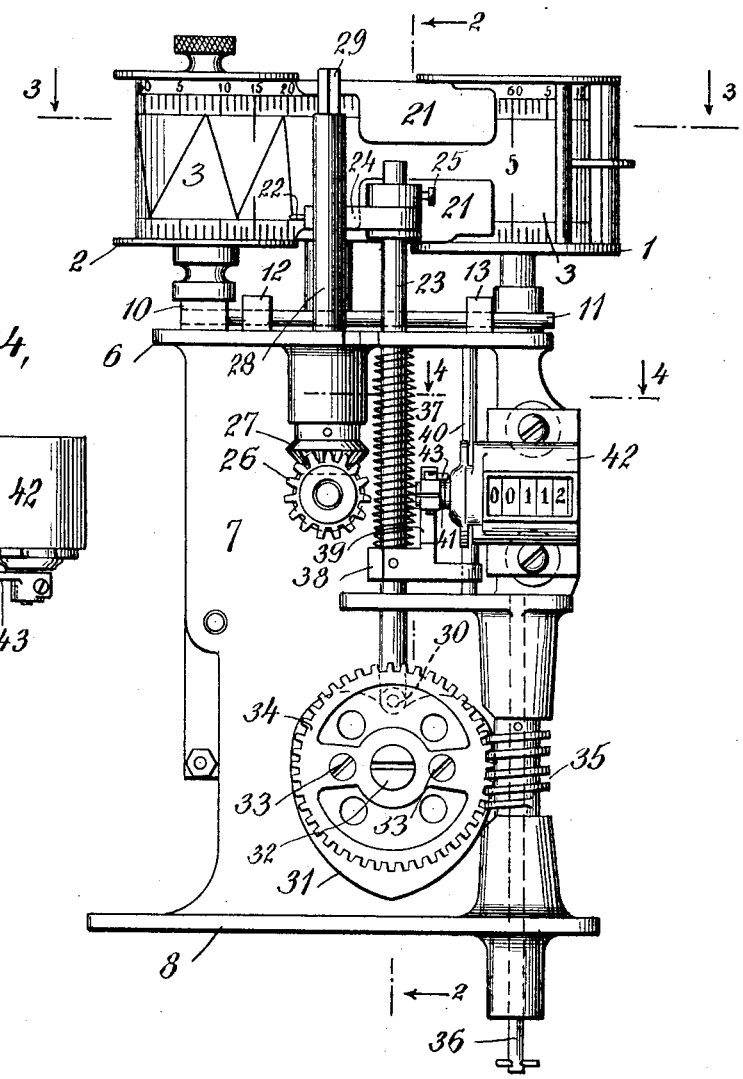

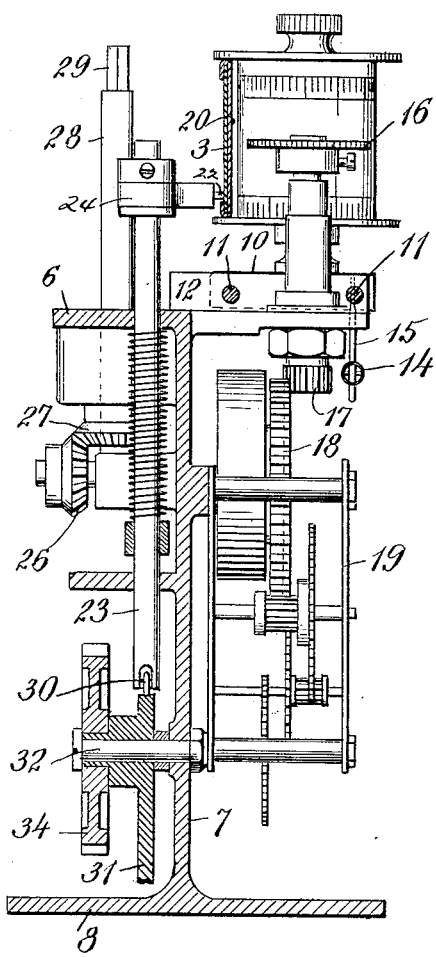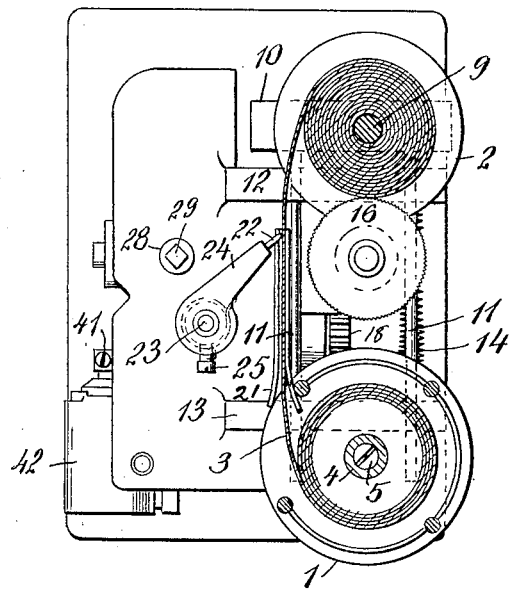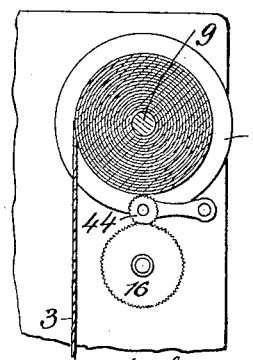

AUBREY H. MARTIN, OF SHORT HILLS, NEW JERSEY, ASSIGNOR TO JAMES E. BROWN, OF NEWARK, NEW JERSEY.

SPEED-RECORDER.

1,160,633.  Specification of Letters Patent.  Patented Nov. 16, 1915.

Application filed January 30, 1912, Serial No. 674,342. Renewed April 13, 1915. Serial No. 21,145.

*To all whom it may concern:*

Be it known that I, AUBREY H. MARTIN, a citizen of the United States, residing at Short Hills, county of Essex, State of New Jersey, have invented certain new and useful Improvements in Speed-Recorders; and I do hereby declare the following to be a full, clear, and exact description of the invention, such as will enable others skilled in the art to which it appertains to make and use the same.

My invention relates to certain new and useful improvements in speed recorders, and embodies a construction wherein the recording member, or stylus, is adapted to be moved back and forth automatically by mechanism actuated from a vehicle or the like, and coöperating with a paper strip or tape, which is fed in predetermined amounts past the stylus by means of a clockwork mechanism.

The tape-feeding device consists of a supply receptacle for the tape, a roll adapted, as it is revolved, to wind the tape from the supply device, and a knurled disk or idler, together with means for maintaining the roll, and consequently the tape, in operative relation to the disk or idler, so that the disk or idler will feed a predetermined amount of tape upon the roll.

In the accompanying drawings, Figure 1 represents, in elevation, a speed recorder embodying my improvements; Fig. 2 represents a side view thereof, partly in section, on the line 2—2 of Fig. 1; Fig. 3 represents a sectional plan view on the line 3—3 of Fig. 1; Fig. 4 represents a detail plan view on the line 4—4 of Fig. 1; and Fig. 5 represents a top plan view showing a modification of the mechanism for feeding the paper strip.

Similar numerals of reference indicate similar parts throughout the several views.

Referring to the drawings, 1 indicates the supply-case, in which the paper strip or tape 3 is stored in any convenient manner, said supply-case preferably consisting of upper and lower plates, as shown, connected by posts or columns and having a circumferential rail or wire joining the columns. The supply-case is further provided with a hollow central sleeve 4 whereby it is adapted to revolve freely upon the post 5. The supply-case is suitably mounted upon the table 6 of the frame 7 whose base 8 is designed for attachment to the automobile or other vehicle whose speed is to be recorded.

2 indicates a take-up roll for the paper strip or tape 3. The take-up roll is adapted to rotate freely upon the fixed central post 9 which post is mounted in a cross-head 10. The cross-head 10 carries two rods 11 which pass through guide apertures in the flanges 12, 13 of the table 6. A tension spring 14 joining a pin 15 on the slide 10 with a similar pin on the table 6 solicits the take-up roll 2 in a direction toward the supply-case 1 and maintains the paper strip or tape 3 as it is wound upon the take-up roll in constant, though yielding engagement with the knurled or toothed disk 16.

The knurled or toothed disk 16 is carried by a shaft which is provided at its lower end with a pinion 17 in engagement with a crown-wheel 18, which latter is mounted upon the main spring shaft of a clock-work mechanism 19 of any suitable kind. The main spring shaft of the clock-work mechanism is provided with a bevel gear 26 engaging with a bevel gear 27 which latter is mounted on the winding post 28, so that by applying a suitable key to the squared top 29 of the winding shaft, the main spring of the clock-work mechanism can be wound up.

The paper strip or tape 3 is sub-divided into gradations indicating hours and minutes of the day, and by the mechanism described is adapted to be wound from the supply-case in predetermined amounts for equal units of time, and stored upon the take-up roll 2. In passing from the storage case to the take-up roll, the tape passes over a flat table 20, preferably of sheet metal, having guide lugs 21. The disk 16 is driven from the clock-work 19 so as to make one complete revolution in every hour, and is maintained by the spring 14 in operative relation with the take-up roll 2 and the paper strip or tape 3 as the latter is wound upon the take-up roll. It will be understood that by substituting for the disk 16 another disk of different diameter, the amount of paper fed during a single revolution of the disk may be varied. Coöperating with the paper strip or tape is a pencil or stylus 22 which is carried in a holder 24 mounted on the rod 23 between collars thereon. The stylus 22 is held in spring engagement with the paper strip 3, its holder being free to rock upon the rod 23 for that purpose. The rod 23 is movable up and down in bearings in the frame 7. At its lower end, the rod 23 is provided with a friction roller 30 which rides upon a heart-shaped cam 31. The cam 31 is mounted to rotate freely upon a fixed stud-shaft 32 and is rigidly connected with a worm-wheel 34. The worm-wheel engages a worm-shaft 35 whose shaft 36 is adapted to be operated by any suitable intermediate connections from the traction wheels of the vehicle.

A spring 37 reacting between the lower surface of the table 6 and a fixed lug or collar 38 tends to hold the idle roller 30 in constant engagement with the periphery of the heart-shaped cam, but permits the rod to rise as the heart-shaped cam rotates. The lug or collar 38 is provided with an upright 39 and is itself guided upon a guide-rod 40, so that it is adapted to move upwardly with the rod as the heart-shaped cam revolves. In its upward travel, the lug or collar 38 carries with it the actuating lever 41 of any suitable counting device 42, and, in the downward movement of the lug or collar 38, a pin 43 thereon returns the actuating lever to its initial position at the hollow of the heart-shaped cam, that is, the position indicated in Fig. 1 of the drawings. The mechanism is so calculated that the stylus is reciprocated back and forth across the paper strip or tape 3 once for each recorded unit on the counter, the carrying of each next succeeding unit being effected at a completion of the down-stroke of the sliding rod 23. Consequently, according to the speed of travel of the vehicle, a line will be traced across the face of the paper strip as indicated in Fig. 1, and will indicate the period of time during which each successive unit of travel is made by the vehicle, thereby measuring the speed of travel of the vehicle per unit of time.

In the modification indicated in Fig. 5, the paper strip 3 is shown as driven by an idler 44 interposed between the disk 16 and the paper strip, and driven by the disk, whose teeth are suitably formed for the purpose. The idler 44 will be of particular use in those instances where a considerable amount of paper tape is wound upon the take-up roll. In such case, the idler being of relatively small diameter, will have a more effective driving action than would be the case if it were of the diameter of the disk 16 itself. The counting mechanism 42 may be of any suitable type, as, for instance, the counting mechanism shown in United States Patent No. 634073, dated October 3, 1899.

It will be further noted that the take-up roll and the supply case of the tape-operating device are removably mounted upon the frame, and, in practice, it is intended to inclose the upper portion of the mechanism; that is to say, the portion above the table 6 within a locked casing, accessible only to an authorized person having a key, and to surround the entire mechanism below said table 6 with a casing having no key but whose bottom will be constituted by the base 8, the frame being secured to the lower casing, by means accessible only after the upper casing is unlocked. By this arrangement, it is impossible for any one not provided with a key to obtain access to any portion of the mechanism; but a person provided with a key may open the upper casing and may then remove the entire mechanism by permitting it to slip downwardly through the main casing.

Having thus described my invention what I claim is:

1. A speed recorder for recording the movements of a stylus, or other like member driven automatically from a vehicle, including a device for feeding a paper strip or tape in predetermined amounts past said member and a clock-work for operating the tape-feeding device, said tape-feeding device consisting of a supply receptacle for the tape, a take-up roll adapted, as it revolves, to wind the tape thereon, and a driving disk provided on its periphery with a surface adapted to grip the tape, guide rods connected to the take-up roll and passing through suitable guide apertures in the supporting frame-work of the speed recorder, and a spring soliciting the take-up roll toward the disk; substantially as described.

2. A speed recorder for recording the movements of a stylus or other like member driven automatically from a vehicle, including a device for feeding a paper strip in predetermined amounts past said member and a clock-work for operating the tape-feeding device, said tape-feeding device consisting of a supply receptacle for the tape, a take-up roll adapted, as it revolves, to wind the tape thereon, a disk provided on its periphery with a surface adapted to grip the tape, the driving shaft for said disk being driven directly from a gear on the main spring shaft of the clock-work, and means for maintaining the take-up roll and the tape thereon in operative relation with the said disk; substantially as described.

3. A speed recorder for recording the movements of a stylus driven automatically from a vehicle, including a device for feeding a paper strip or tape in predetermined amounts past said stylus, a reciprocating rod upon which the stylus is mounted, a heart-shaped cam upon whose periphery the reciprocating rod rests, a spring for holding the rod in contact with the periphery of the cam, an arm carried by the rod and moving therewith, and a counting mechanism provided with a lever actuated by the arm carried by the rod; substantially as described.

4. A speed recorder for recording the movement of a stylus or other like member driven automatically from a vehicle, including a device for feeding a paper strip or tape in predetermined amounts past said member, and a clock-work for operating the tape-feeding device, a frame provided at its upper part with posts upon which the tape-feeding device is removably mounted, a clock-work for operating the tape-feeding device, cam-actuated mechanism for operating the stylus, and a counter having an actuating lever in the path of movement of the stylus-operating mechanism; substantially as described.

5. A speed recording instrument comprising the combination of a support, a shaft mounted for rotation therein, a cam geared to said shaft and rotated thereby, a rod mounted on the support and reciprocated axially by the cam, a counter actuated by the rod, a marker mounted on the rod, tape-supporting devices for supporting the tape in coöperative relation to said marker, tape-feeding mechanism and a clock mechanism for operating the tape-feeding mechanism; substantially as described.

6. A speed recording instrument comprising the combination of a support, a shaft mounted for rotation therein, a rod mounted on the support parallel to said shaft and adapted to be reciprocated, a cam upon which the the end of the rod bears, a shaft transverse to said shaft on which the cam is mounted, gearing connecting said shafts, a counter, means on said rod for actuating the counter, a marker mounted on the rod, tape-supporting devices for supporting a tape in coöperative relation to the marker, tape-feeding mechanism and a clock mechanism for actuating the tape-feeding mechanism; substantially as described In testimony whereof I affix my signature, in presence of two witnesses.

AUBREY H. MARTIN.

Witnesses:
JOHN C. PENNIE,
MINERVA LOBEL.

Copies of this patent may be obtained for five cents each, by addressing the "Commissioner of Patents. Washington, D. C."